US008451438B2

(12) United States Patent
Park et al.

(10) Patent No.: US 8,451,438 B2
(45) Date of Patent: May 28, 2013

(54) INTEGRATING SPHERE PHOTOMETER AND MEASURING METHOD OF THE SAME (75) Inventors: Seongchong Park, Daejeon (KR); Dong Hoon Lee, Daejeon (KR); Seung Nam Park, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 13/598,910

(22) Filed: Aug. 30, 2012

(65) Prior Publication Data
US 2012/0320371 A1    Dec. 20, 2012

Related U.S. Application Data (63) Continuation of application No. PCT/KR2011/000970, filed on Feb. 14, 2011.

(30) Foreign Application Priority Data

Mar. 2, 2010  (KR) .................. 10-2010-0018356

(51) Int. Cl.
*G01J 1/42*    (2006.01)
(52) U.S. Cl.
USPC ......... 356/236; 356/243.1; 356/326; 250/228
(58) Field of Classification Search
USPC ............ 356/236, 326, 243.1–243.8; 250/228
See application file for complete search history.

(56) References Cited

U.S. PATENT DOCUMENTS

| 4,915,500 | A  | * | 4/1990  | Selkowitz ..................... 356/221 |
| 6,721,048 | B2 | * | 4/2004  | Yokota et al. ................. 356/319 |
| 7,508,503 | B2 | * | 3/2009  | Jang .............................. 356/236 |
| 8,144,316 | B2 | * | 3/2012  | Park et al. ..................... 356/236 |
| 2008/0129996 | A1 | * | 6/2008 | Liu et al. ....................... 356/326 |
| 2009/0051910 | A1 | * | 2/2009 | Imura ......................... 356/243.8 |
| 2012/0229801 | A1 | * | 9/2012 | Park et al. ..................... 356/236 |

FOREIGN PATENT DOCUMENTS

| JP | 2002-318156 | 10/2002 |
| JP | 2003-214945 | 7/2003 |
| KR | 20-2002-0035754 | 2/2003 |
| KR | 10-2008-0059808 | 6/2010 |

OTHER PUBLICATIONS

International Search Report for PCT/KR2011/000970 dated Oct. 31, 2011.

* cited by examiner

*Primary Examiner* — Hoa Pham
(74) *Attorney, Agent, or Firm* — Jenkins, Wilson, Taylor & Hunt, P.A.

(57) ABSTRACT

An integrating sphere photometer and a measuring method of the same are provided to precisely measure a directional light source. The integrating sphere photometer includes an integrating sphere having a plurality of through-holes, a plurality of photometers disposed at the through-holes, baffles disposed in front of the photometers to be spaced apart therefrom, an auxiliary light source disposed inside the integrating sphere, an auxiliary baffle disposed in front of the auxiliary light source, and a summing unit of output signals of the photometers under the illumination of a light source to be measured disposed in the central area inside the integrating sphere.

5 Claims, 10 Drawing Sheets

INTEGRATING SPHERE PHOTOMETER AND MEASURING METHOD OF THE SAME

CROSS-REFERENCE TO RELATED APPLICATIONS

This application is a continuation of and claims priority to PCT/KR2011/000970 filed on Feb. 14, 2011, which claims priority to Korea Patent Application No. 10-2010-0018356 filed on Mar. 2, 2010, the entireties of which are both incorporated by reference herein.

BACKGROUND

1. Field of the Invention

The present invention relates to an integrating sphere photometer for measuring total luminous flux (unit: 1 m) which is one of the optical characteristics of light emitting devices. More specifically, the present invention is directed to an integrating sphere photometer capable of omitting correction of an error caused by a difference in output spatial distribution between a light source to be measured and a standard light source through spatial averaging using a plurality of photometers during measurement by comparison of the standard light source and the light source to be measured in the integrating sphere.

2. Description of the Related Art

Total luminous flux of a light source means the sum of luminous flux (unit: 1 m) that a light source emits in all directions. A luminous efficiency (unit: 1 m/W) of the light source is determined as a ratio of a total luminous flux (unit: 1 m), which is a light output, to an input electrical power (unit: W). Therefore, a precise measurement of the total luminous flux is important in evaluating the performance of luminaires.

Commonly, measurement of the total luminous flux is performed using a gonio-photometer. After a spatial distribution of an output luminous flux is measured over 4π-solid angle, the total luminous flux can be obtained by numerically integrating the measured luminous flux distribution.

Alternatively, measurement of the total luminous flux can be performed using an integrating sphere photometer. In principle, an integrating sphere photometer provides an output signal that is proportional to luminous flux enclosed with an integrating sphere. From the proportionality, a standard light source whose total luminous flux is known and a light source to be measured are sequentially put into the integrating sphere photometer to be turned on. Output signals of the standard light source and the light source to be measured are measured and compared with each other to measure a total luminous flux. An integrating sphere photometer is advantageous in simpler instrumental configuration and shorter measurement time than a gonio-photometer. When a standard light source and a light source to be measured are identical in type, the integrating sphere photometer may easily obtain the total luminous flux of high precision through the simple comparison. Due to these advantages, the integrating sphere photometer is being widely used in practical fields.

However, when a standard light source and a light source to be measured are different in shape, output spectral distribution, and output spatial distribution, the integrating sphere photometer must be subjected to a correction procedure to achieve a precise measurement. The correction procedure may include self-absorption mismatch correction, spectral mismatch correction, and spatial mismatch correction. The self-absorption mismatch correction and the spectral mismatch correction may be performed without a big difficulty. For the spatial mismatch correction, however, we have to know not only a luminous intensity distribution of a light source to be measured but also a spatial response function of the integrating sphere photometer which is highly complicated to measure. Therefore, it is practically impossible to precisely measure a total luminous flux of a directional light source having large spatial mismatch.

On using an integrating sphere photometer, one of the major errors is a spatial mismatch error, which occurs when a standard light source and a light source to be measured have different spatial distribution of light emission.

The spatial mismatch error originates from the non-uniformity of the sphere response. Note that any real integrating sphere photometer cannot show a uniform response in all directions like an ideal integrating sphere photometer. In order to correct the spatial mismatch error, spatial response correction must be performed by measuring both a spatial response distribution function (SRDF) of the integrating sphere photometer and a spatial output distribution of a light source to be measured. Precise spatial response correction needs a more complex procedure than a complete total luminous flux measuring method using a gonio-photometer. For this reason, in an integrating sphere device for use in an industrial field of which purpose is not to maintain a primary measurement standard, a spatial response error is generally minimized using a standard light having the same spatial output distribution as a light source to be measured. However, if a light source to be measured is changed, another suitable standard lamp must be prepared for each light source to be measured.

SUMMARY

Embodiments of the present invention provide an integrating sphere photometer and a measuring method of the same. The integrating sphere photometer may remove an error caused by spatial mismatch introduced during measuring of a total luminous flux of a light source which has a variety of directionality.

According to one embodiment of the present invention, the integrating sphere photometer may include an integrating sphere having a plurality of through-holes, a plurality of photometers disposed at the through-holes, baffles disposed in front of the photometers to be spaced apart therefrom, and a correction unit correcting output signals of the photometers to have the same response characteristics to light emitted from a standard light source disposed in the central area inside the integrating sphere.

According to another embodiment of the present invention, the integrating sphere photometer may include an integrating sphere having a plurality of through-holes, a plurality of photometers disposed at the through-holes, baffles disposed in front of the photometers to be spaced apart therefrom, an auxiliary light source disposed inside the integrating sphere, an auxiliary baffle disposed in front of the auxiliary light source, and a summing unit summing output signals of the photometers to light emitted from a light source to be measured disposed in the central area inside the integrating sphere.

According to one embodiment of the present invention, the measuring method may include providing a plurality of photometers disposed at through-holes of an integrating sphere having the through-holes and baffles spaced apart from the photometers, providing an auxiliary light source inside the integrating light source and an auxiliary baffle in front of the auxiliary light source, and correcting the photometers to have the same response characteristics to light emitted from a standard light source disposed in the central area inside the integrating sphere.

According to one embodiment of the present invention, the measuring method may include providing a plurality of photometers inside an integrating sphere and baffles in front of the photometers, providing an auxiliary light source inside the integrating sphere and an auxiliary baffle in front the auxiliary light source, providing a light source to be measured or a standard light source in a central area inside the integrating sphere, and summing output signals of the photometers to light of the light source to be measured or the standard light source disposed in the central area inside the integrating sphere.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present invention.

DETAILED DESCRIPTION

The present invention will be described more fully hereinafter with reference to the accompanying drawings, in which preferred embodiments of the invention are shown. This invention may, however, be embodied in many different forms herein. Rather, these embodiments are provided so that this disclosure will be thorough and complete, and will fully convey the scope of the invention to those skilled in the art. In the drawings, like numbers refer to like references.

There is a demand for an integrating sphere photometer which is capable of measuring a total luminous flux of a light source to be measured having directionality while not being different in function from a conventional integrating sphere photometer using a standard light source. It is necessary for the integrating sphere photometer to eliminate an error caused by a spatial mismatch.

The present invention will now be described more fully hereinafter with reference to the accompanying drawings, in which preferred embodiments of the present invention are shown. However, the present invention may be embodied in many different forms and should not be construed as limited to the embodiments set forth herein. Rather, these embodiments are provided so that this disclosure will be thorough and complete, and will fully convey the scope of the present invention to those skilled in the art. In the drawings, elements are exaggerated for clarity. Like numbers refer to like elements throughout.

Now, the operation principle of the present invention will be described below.

Figure 1:
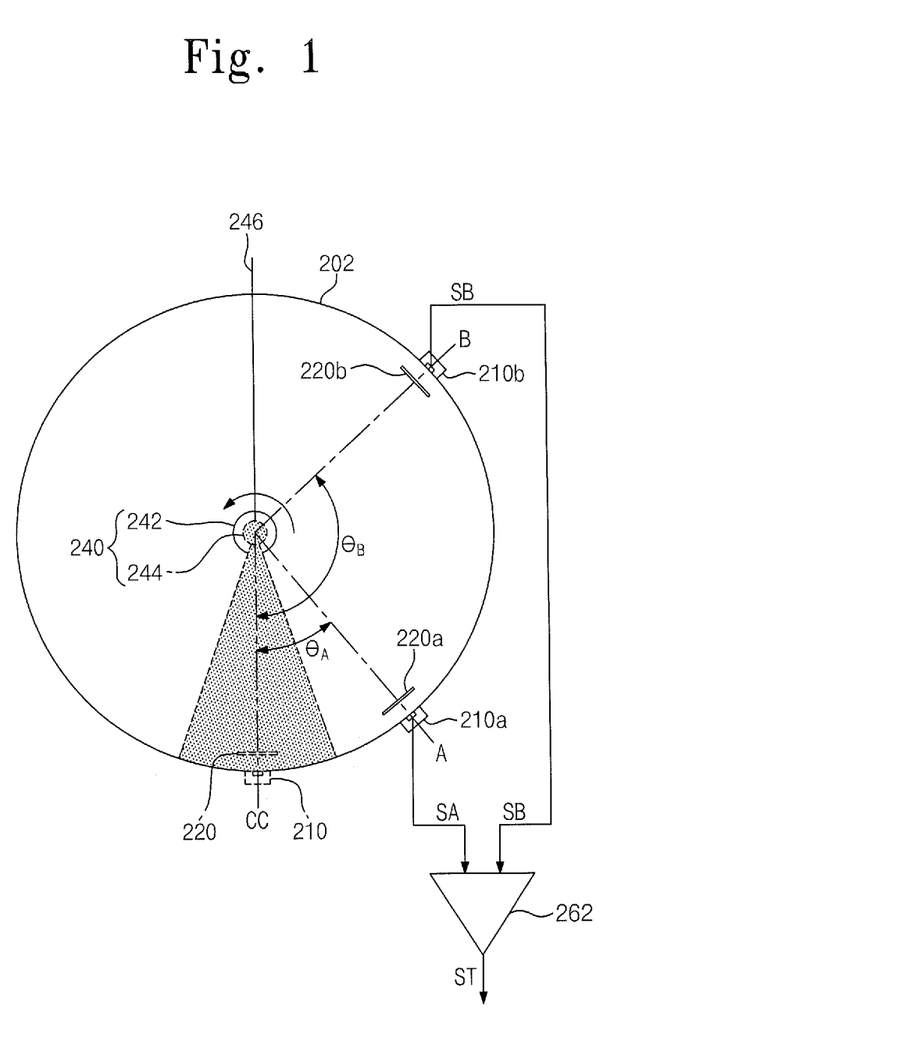
FIGS. 1 to 3 are a sectional view of an integrating sphere photometer according to one embodiment of the present invention and graphic diagrams illustrating an output signal of the integrating sphere photometer, respectively.
Figure 2:
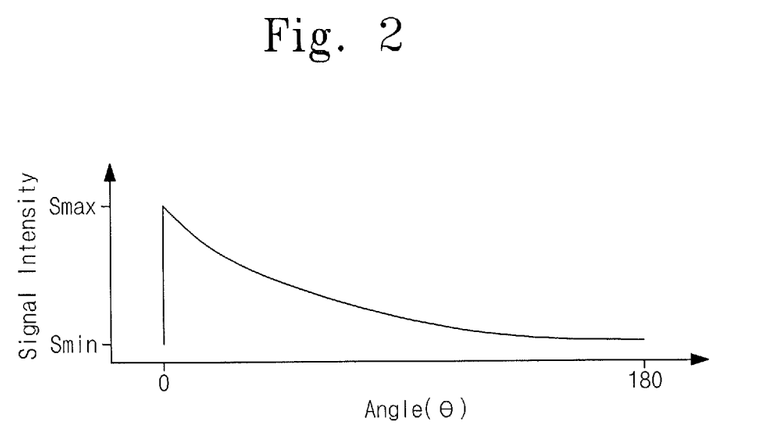
Figure 3:
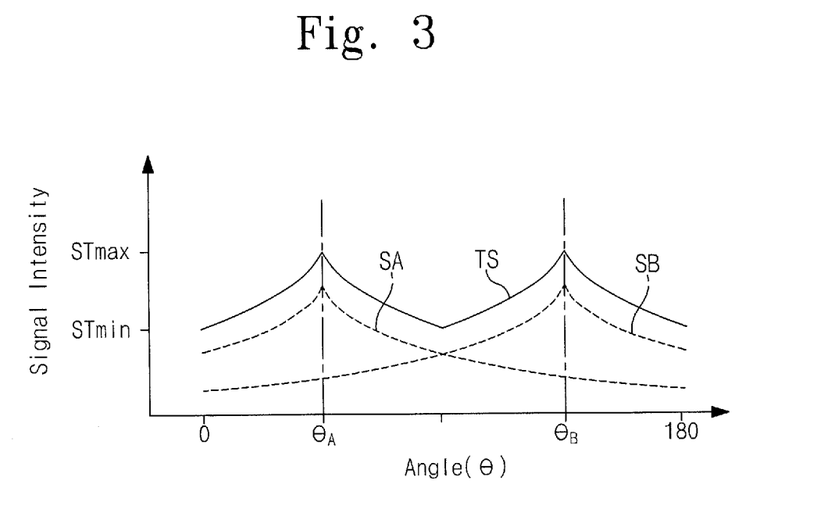

FIGS. 1 to 3 are a sectional view of an integrating sphere photometer according to one embodiment of the present invention and graphic diagrams illustrating an output signal of the integrating sphere photometer, respectively.

Referring to FIG. 1, a light source to be measured 240 is disposed in a central area inside an integrating sphere 202. The light source to be measured 240 has a directionality. The light source to be measured 240 may include a light source 244 and a reflector cup 242 providing a directionality to the light source 244. An irradiation direction of the light source to be measured may be a CC direction. A photometer 210 may be mounted on an inner surface of the integrating sphere 202 in the CC direction. A baffle 220 may be mounted in front of the photometer 210 to prevent light emitted from the light source to be measured 240 from directly reaching the photometer 210.

The light source to be measured 240 may rotate around the axis which is normal to this sectional view of FIG. 1 and pass through the center of the light source to be measured. In this case, an output signal characteristics of the photometer 210 fixed in the CC direction is shown in FIG. 2. At this point, FIG. 2 is referred to as a spatial response distribution function (SRDF) of an integrating sphere.

Referring to FIG. 2, an output signal of the photometer 210 is dependent on an angle θ between the CC direction and the irradiation direction of the light source to be measured 240. The output signal of the photometer 210 has a maximum value $S_{MAX}$ when the irradiation direction of the light source to be measured 240 faces the photometer 210. On the other hand, the output signal of the photometer 210 has a minimum value $S_{MIN}$ when the irradiation of the light source to be measured 240 leans against the photometer 210. That is, as shown in FIG. 2, if a light source has a directionality although a total luminous flux of the light source is constant, a response signal of an integrating sphere photometer varies with a direction of the light source and thus a total luminous flux measuring value varies in proportion to a response signal. The higher a directionality of a light source, the greater a difference between a maximum value $S_{MAX}$ and a minimum value $S_{MIN}$. The difference becomes a spatial mismatch error. In order to correct the spatial mismatch error, a spatial response function must be measured using a light source having a very high directionality to one integrating sphere photometer and an output spatial distribution of a light source to be measured must be measured.

Referring to FIGS. 1 and 3, the photometer 210 and baffle 220 are removed, and the first photometer 210a and the first baffle 220a are disposed at the first angle $\theta_A$. In addition, the second photometer 210b and the second baffle 220b are disposed at the second angle $\theta_B$. In this case, when the light source to be measured 240 rotates, an output signal of the first photometer 210a is SA and an output signal of the second photometer 210b is SB. The sum of the output signals of the first and second photometers 210a and 210b is ST. The output signals of the first and second photometers 210a and 210b are summed by a summing unit 262. That is, when a plurality of photometers 210a and 210b are disposed inside the integrating sphere 202 to use a summing signal of the output signals of the first and second photometers 210a and 210b as a representative signal of an integrating sphere photometer, a difference between a maximum value $TS_{MAX}$ and a minimum value $TS_{MIN}$ of an integrating sphere photometer may become smaller than a difference shown in FIG. 2. The sum of the output signals of the photometers 210a and 210b provides an effect to average a spatial response distribution function, and a difference between maximum and minimum values of the ST ($TS_{MAX}-TS_{MIN}$) is reduced. As a result, a measurement error caused by spatial mismatch is reduced. Although a case where two photometers are disposed has been described in FIG. 2, the operation principle of the present invention may also be applied to a case where three or more photometers are disposed. The larger the number of photometers, the smaller a difference therebetween.

Moreover, the light source to be measured of the integrating sphere photometer does not substantially rotate. In this case, the operation principle of the present invention is equivalently applied.

Figure 4:
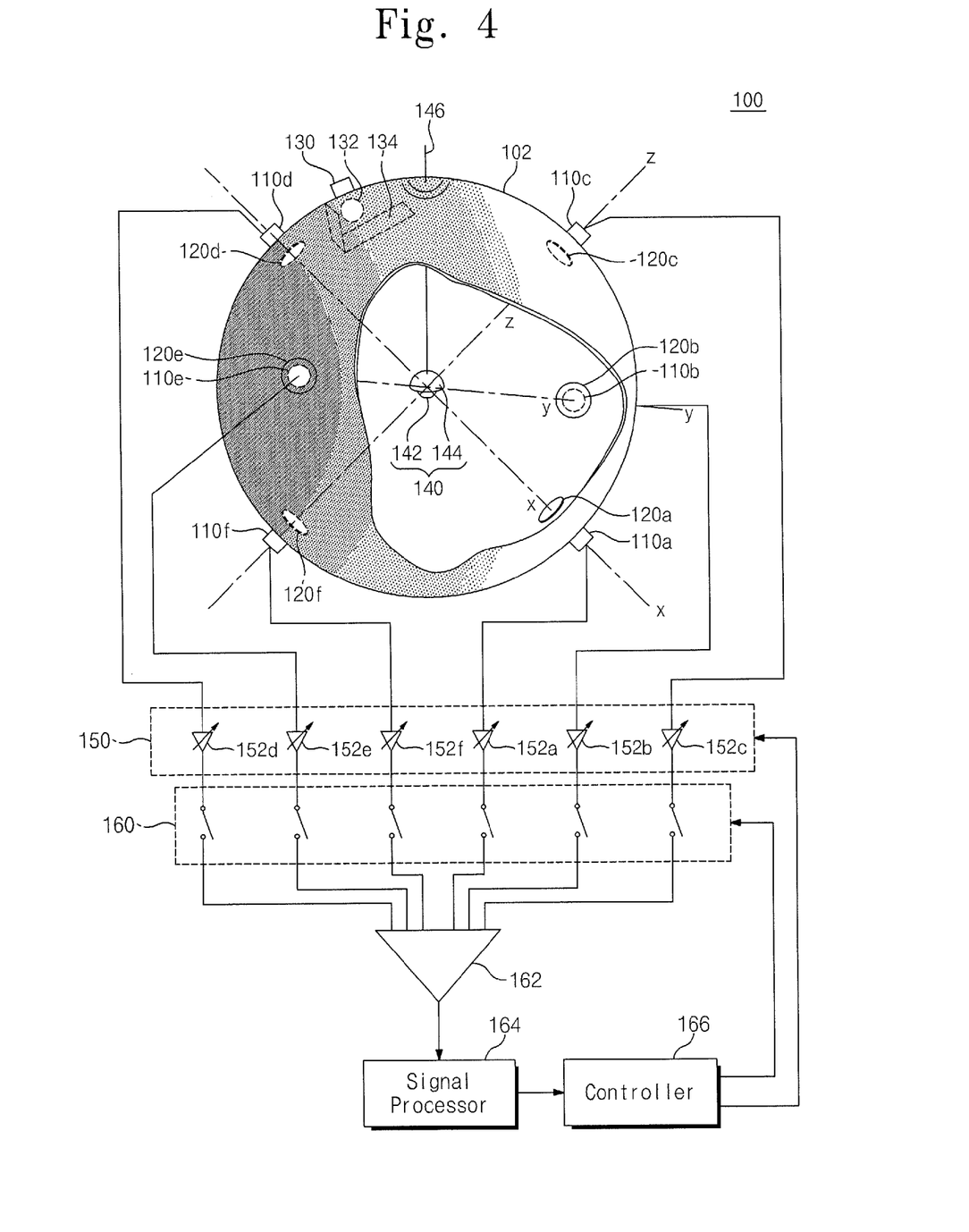
FIGS. 4 and 5 are a perspective view and a sectional view of an integrating sphere photometer according to another embodiment of the present invention, respectively.
Figure 5:
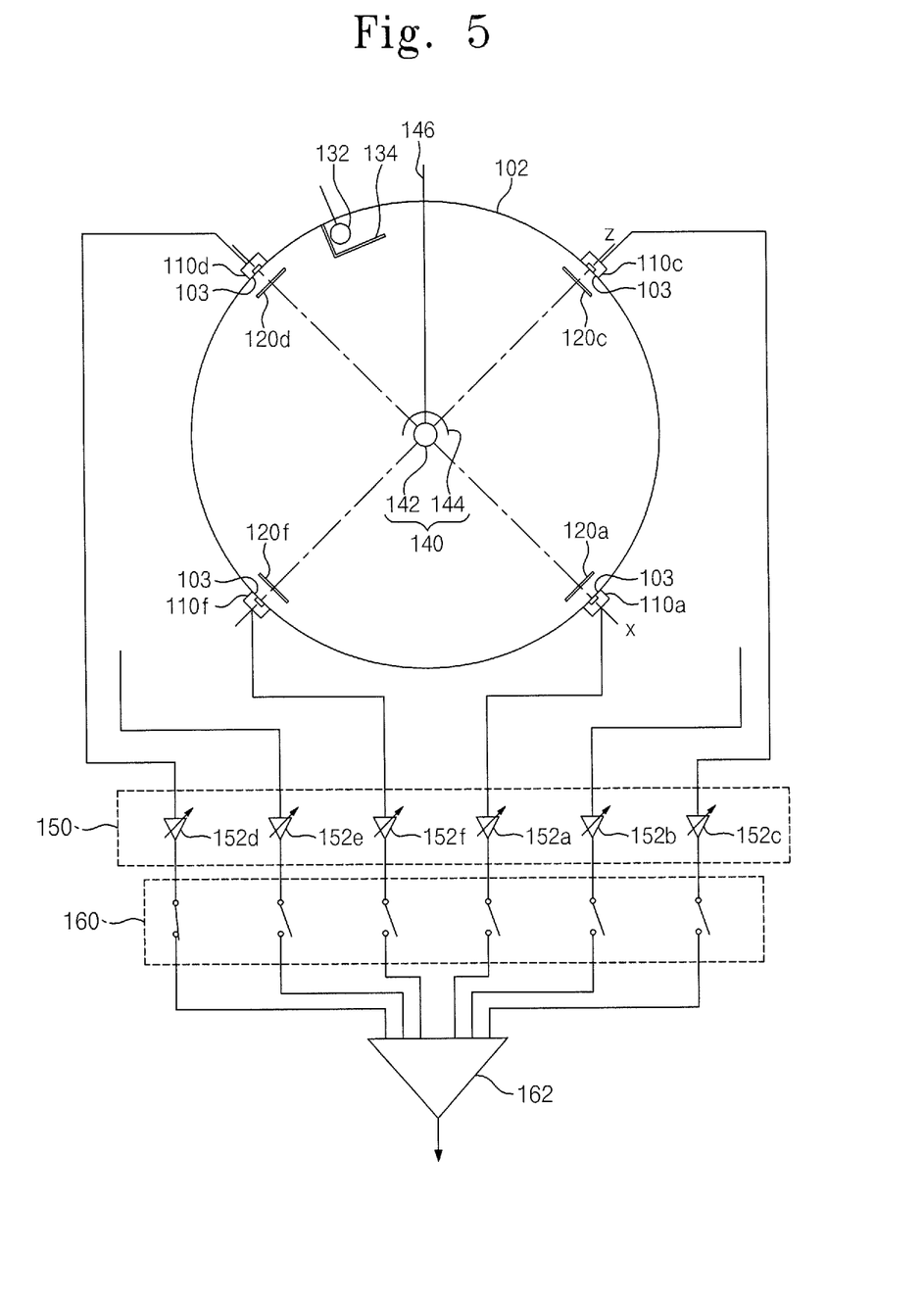

FIGS. 4 and 5 are a perspective view and a sectional view of an integrating sphere photometer according to another embodiment of the present invention, respectively.

Referring to FIGS. 4 and 5, the integrating sphere photometer 100 includes an integrating sphere 102 having a plurality of through-holes 103, a plurality of photometers 110a~110f disposed at the through-holes 103, baffles 120a~120f disposed in front the photometers 110a~410f to be spaced apart therefrom, an auxiliary light source 132 disposed on an inner surface of the integrating sphere 102, an auxiliary baffle disposed in front of the auxiliary light source 132, and a summing unit 162 configured to sum output signals of the photometers 110a~110f to the light of a light source to be measured 140 disposed in a central area inside the integrating sphere 102.

The integrating sphere 102 may be tens of centimeters to several centimeters in diameter. A reflectance R of an inner circumferential surface of the integrating sphere 102 may be 90 percent or higher. The inner circumferential surface of the integrating sphere may be a spherical surface substantially. The integrating sphere may comprise a plurality of removable parts. The inner circumferential surface of the integrating sphere 102 may reflect light diffusely.

The through-holes 103 may be formed on a surface of the integrating sphere 102 to be symmetrically opposite to the center of the integrating sphere 102. If the center of the integrating sphere 102 is the origin and a radius of the integrating sphere 102 is given as L, the through-holes 103 may be arranged on (L, 0, 0), (−L, 0, 0), (0, L, 0), (0, −L, 0), (0, 0, L), and (0, 0, −L) in a rectangular coordinate system.

The photometers 110a~110f provide an output signal which is proportional to the intensity of radiation, based on the principle that an electrical signal is generated when photons reach the photometers 110a~110f. The photometers 110a~410f may be inserted into the through-holes 103 formed on the surface of the integrating sphere 102 or be positioned at the back of the through-holes 103.

The baffles 120a~420f may be spaced apart from the photometers 110a~110f to be disposed inside the integrating sphere 102. If the center of the integrating sphere 102 is the origin and a radius of the integrating sphere 102 is given as L, the baffles 120a~120f may be mounted on six points near the (L, 0, 0), (−L, 0, 0), (0, L, 0), (0, −L, 0), (0, 0, L), and (0, 0, −L) in the rectangular coordinate system. Central axes of the baffle 120a~120f may match those of the photometers 110a~110f, respectively.

The baffles 120a~120f may prevent light emitted from the light source to be measured 140 or a standard light source (not shown) from directly impinging on the photometers 110a~110f. Each of the baffles 120a~420f may have a disk shape. A reflectance of the baffles 120a~120f may be 90 percent or higher. Each of the baffles 120a~120f may have a greater diameter than each of the photometers 110a~410f, each of the through-holes 103, and each of the light source to be measured 140 or the standard light source (not shown).

The auxiliary light source 132 may be disposed adjacent to an inner surface of the integrating sphere 102. An auxiliary baffle 134 may be disposed around the auxiliary light source 132. The auxiliary light source 132 may include at least one selected from the group consisting of a tungsten halogen lamp, a deuterium arc lamp, a Globar lamp, a helium-neon laser, a laser diode, and a white light-emitting diode (LED).

The auxiliary baffle 134 may prevent light emitted from the auxiliary light source 132 from directly impinging on the photometers 110a~110f. In addition, the auxiliary baffle 134 may prevent light emitted from the light source to be measured 140 or the standard light source from directly impinging on the auxiliary light source 132. In addition, the auxiliary baffle 134 may prevent the light emitted from the auxiliary light source 132 from directly impinging on the light source to be measured 140. The auxiliary baffle 134 may be fabricated to have an L-shaped plate.

A luminous intensity distribution depending on an angle of the light source to be measured 140 may be a point light source type or a directional light source type. Preferably, the light source to be measured 140 may have a directionality. The light source to be measured 140 may include a light source 142 and a reflector cup 144. The reflector cup 144 may provide a directionality. The light source to be measured 140 may be fixedly coupled to the integrating sphere 102 by a support bar 146. The support bar 146 may supply a power to the light source to be measured 140.

Accordingly, as described with reference to FIGS. 1 to 3, a spatial mismatch error caused by a directional light source may be reduced by disposing a plurality of photometers inside an integrating sphere and summing output signals of the photometers.

Returning to FIG. 4, the summing unit 162 may sum output signals of the photometers 110a~110f. The summing unit 162 may sum output signals in an analog circuit level or sum output signals through a digital operation after converting analog signals into digital signals.

A correction unit 150 may be disposed between the summing unit 162 and the photometers 110a~110f. The correction unit 150 may correct output signals of the photometers 110a~110f to have identical response characteristics to light emitted from a standard light source disposed in a central area inside the integrating sphere 102.

The correction unit 150 may include preamplifiers 152a~152f configured to amplify output signals of the photometers 110a~110f. When the standard light source turns on, and the gain of the preamplifiers 152a~152f may be adjusted to output the same signal.

The gain of the preamplifiers 152a~152f may be adjusted. Switches 160 may be disposed between the preamplifiers 152a~152f and the summing unit 162. The switches 160 may selectively connect the summing unit 162 to the preamplifiers 152a~152f. The switches 160 may electrically connect the preamplifiers 152a~152f to the summing unit 162 simultaneously or sequentially.

An output signal of the summing unit 162 may be provided to a signal processor 164. The signal processor 164 may convert an analog signal into a digital signal to store data. The output signal of the signal processor 164 may be provided to a controller 166. The controller 166 may control the preamplifiers 152a~152f and the switch 160.

According to a modified embodiment of the present invention, output signals of the photometers may be converted into digital signals by an analog-digital converter. The digital signals may be processed by a computer. Thus, the output signals of the photometers may be summed.

A measuring method of an integrating sphere photometer according to one embodiment of the present invention will now be described with reference to sectional views in FIGS. 6 to 9 and a flowchart in FIG. 10.

Figure 6:
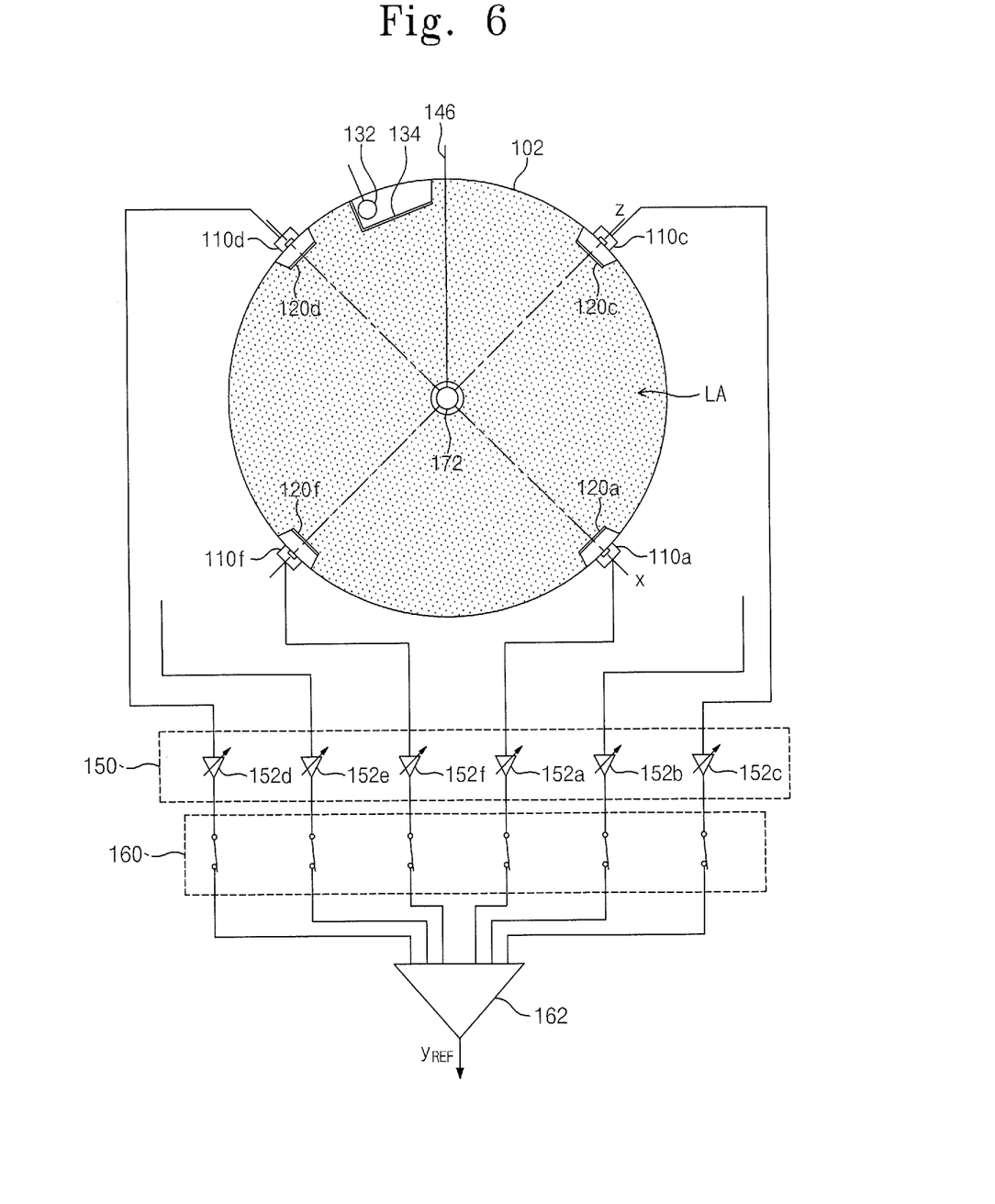
FIGS. 6 to 9 are sectional views illustrating a measuring method of an integrating sphere photometer according to one embodiment of the present invention, respectively.
Figure 10:
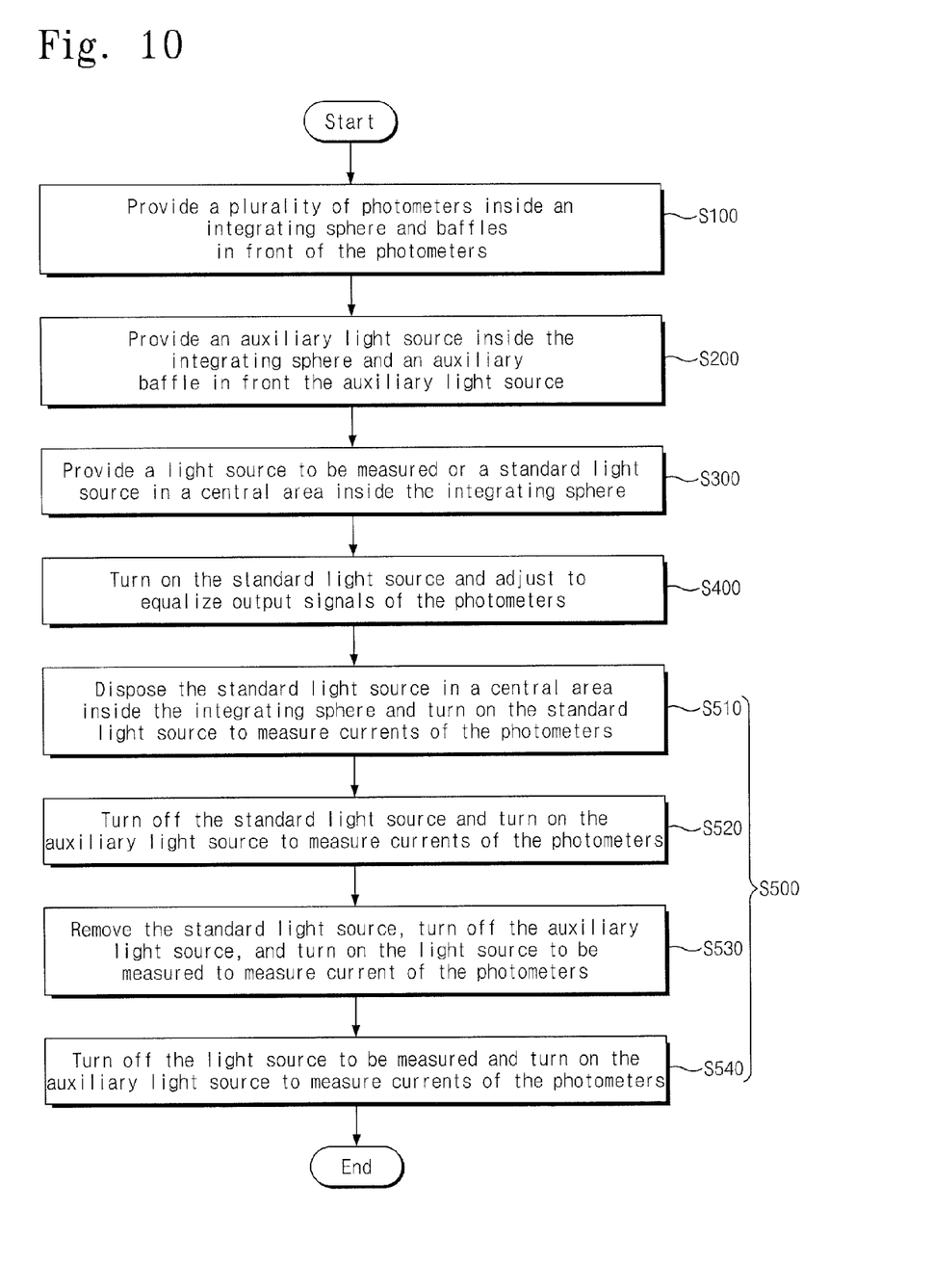
FIG. 10 is a flowchart illustrating a measuring method of an integrating sphere photometer according to one embodiment of the present invention.

Referring to FIG. 6 and FIG. 10, a measuring method of an integrating sphere photometer includes providing a plurality of photometers 110a~110f inside an integrating sphere 102 and baffles 120a~120f in front of the photometers 110a~110f (S100), providing an auxiliary light source 132 inside the integrating sphere 102 and an auxiliary baffle 134 in front of the auxiliary light source (S200), providing a light source to be measured 140 or a standard light source 172 in a central area inside the integrating sphere 102 (S300), and summing output signals of the photometers 110a~110f to the light source to be measured 140 or the standard light source 172 provided in the central area inside the integrating sphere 102 (S500).

Referring to FIG. 6, the standard light source 172 may be turned on and intensities of the output signals of the photometers 110a~110f may be adjusted to the same level (S400). The photometers 110a~110f may include first to sixth photometers. The output signals of the photometers 110a~110f may be provided as input signals of the correction unit 150. The correction unit 150 may include first to sixth preamplifiers 152a~152f. An output of the correction unit 150 may be provided as an input of the summing unit 162.

More specifically, the standard light source 172 is disposed at the integrating sphere 102 to be turned on. Thereafter, a switch 160 sequentially connects the preamplifiers 152a~152f to the summing unit 162. Thus, the summing unit 162 may output different signals according to positions where the photometers 110a~110f are disposed. In this case, the gain of the preamplifiers 152a~152f may be adjusted to make their output signals identical to each other. As a result, after adjusting the gain of the preamplifiers 152a~152f, the output signals of the first to sixth photometers 110a~110f may have the same magnitude. The preamplifiers 152a~152f provide the same response characteristics to the standard light source 172, irrespective of positions of the photometers 110a~110f.

The step (S500) will now be described below in detail.

The switch 160 simultaneously connects the preamplifiers 152a~152f to the summing unit 162. Thus, the summing unit 162 may obtain the sum ($y_{REF}$) of output signals of the photometers 110a~110f to the standard light source 172 (S510). The sum of the output signals of the photometers 110a~110f may provide a spatially averaging effect to reduce a spatial mismatch error. That is, the standard light source 172 is disposed in the central area inside the integrating sphere 102 and the standard light source 172 is turned on to measure and sum currents of the photometers 110a~110f. A total luminous flux $\Phi_{REF}$ of the standard light source is already known. The sum of the currents is $y_{REF}$.

Figure 7:
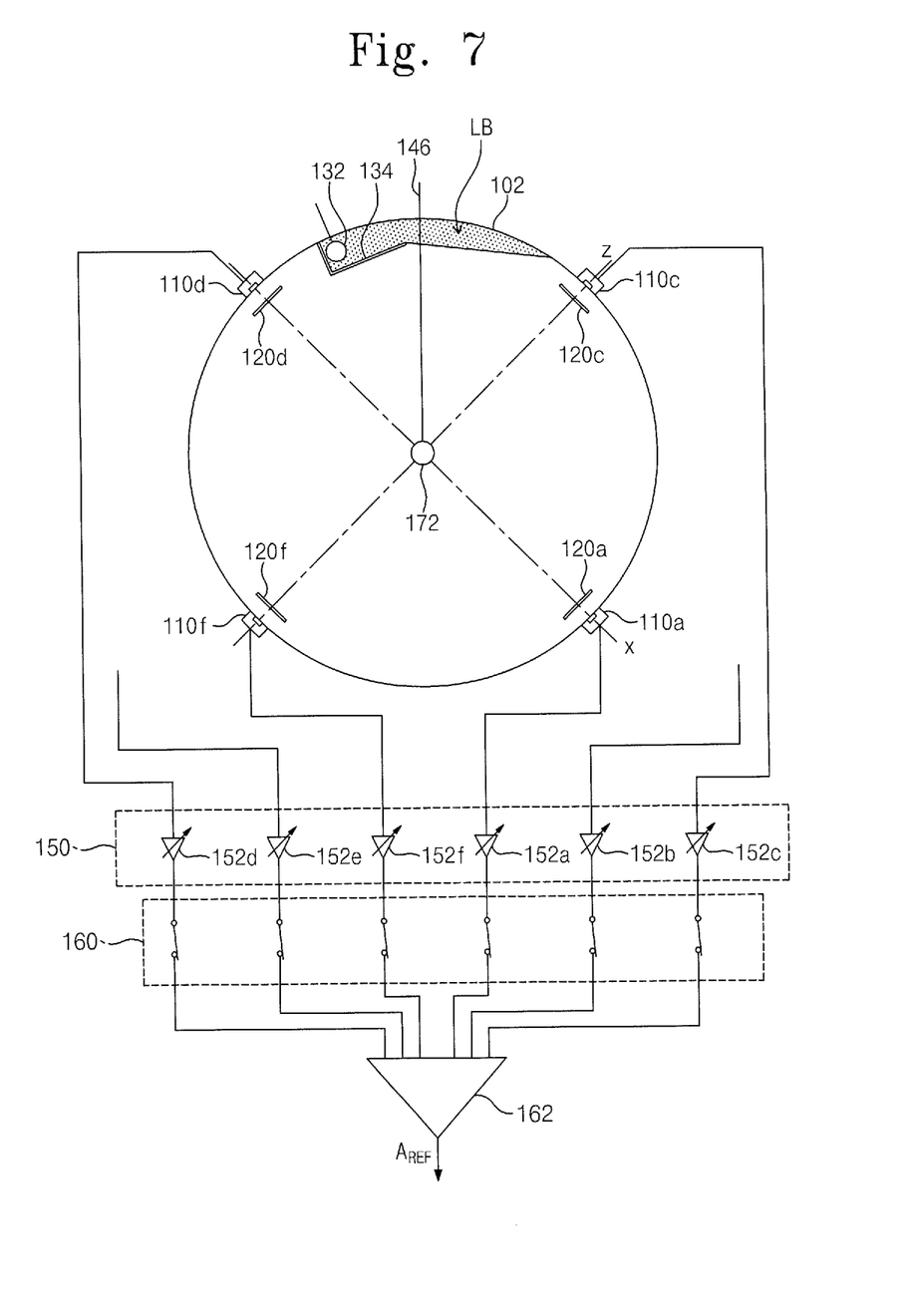

Referring to FIG. 7, the standard light source 172 is turned off and the auxiliary light source 132 is turned on to measure and sum currents of the photometers 110a~110f (S520). The sum of the currents is $A_{REF}$. Absorption correction is carried out by the auxiliary light source 132.

Figure 8:
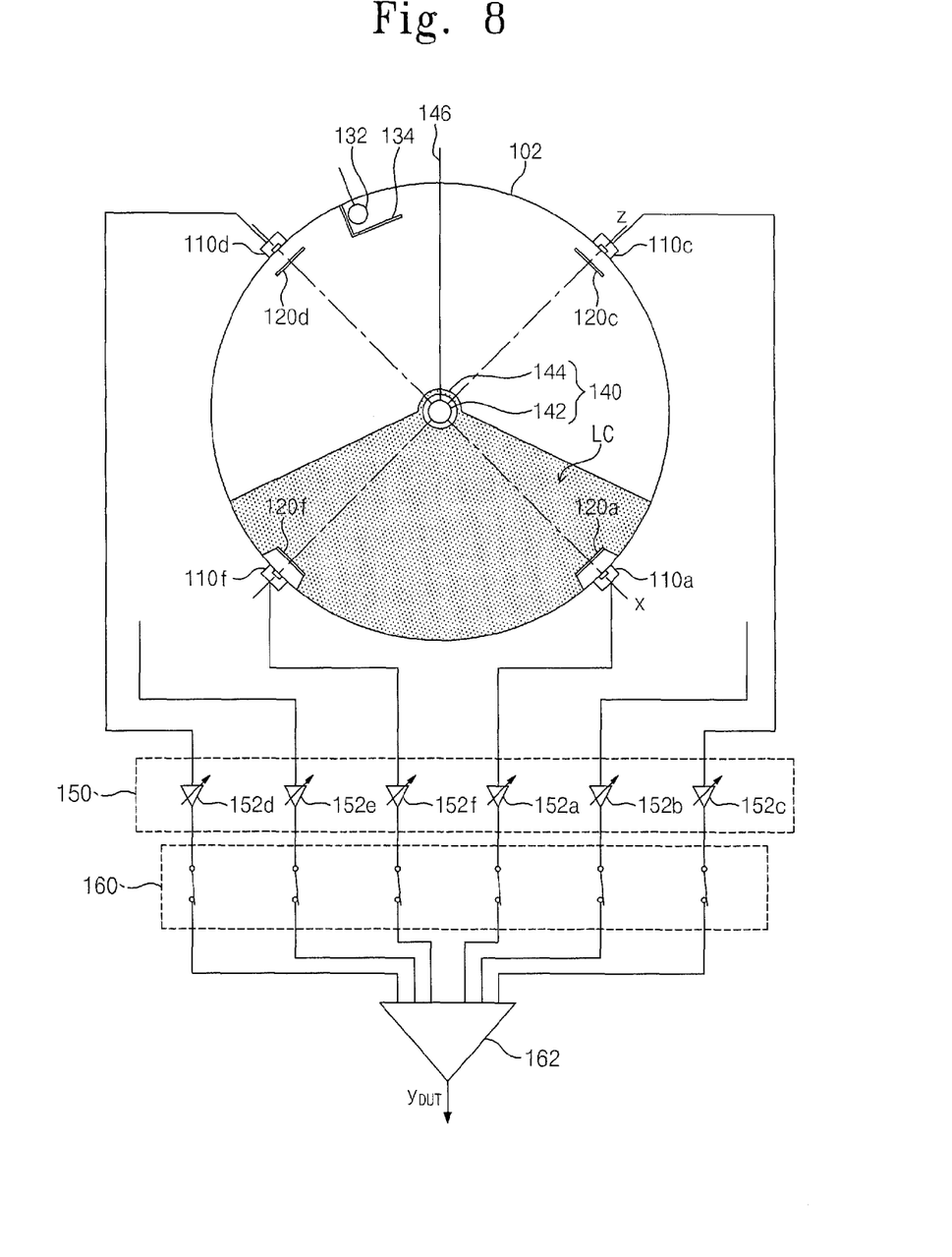

Referring to FIG. 8, the standard light source 172 is removed, the auxiliary light source 132 is turned off, and the light source to be measured 140 is disposed in the central area inside the integrating sphere 102. The light source to be measured 140 is turned on to measure and sum current of the photometers 110a~110f (S530). The sum of the currents is $Y_{DUT}$.

Figure 9:
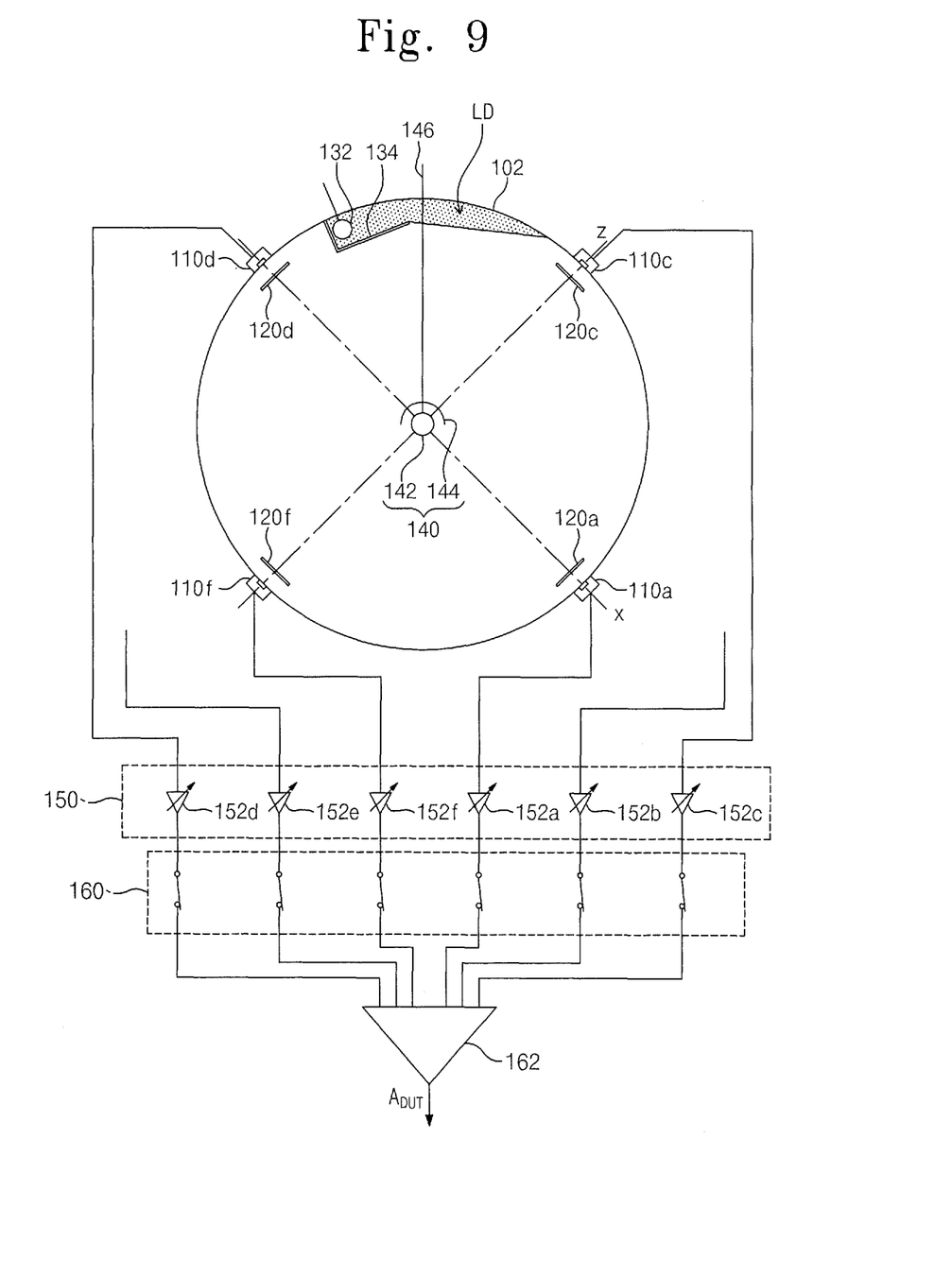

Referring to FIG. 9, the light source to be measured 140 is turned off and the auxiliary light source 132 is turned on to measure currents of the photometers 110a~110f (S540). The sum of currents is $A_{DUT}$.

A total luminous flux $\Phi_{DUT}$ of the light source to be measured 140 is calculated as below:

$$\Phi_{DUT} = \Phi_{REF}\left(\frac{y_{DUT}}{A_{DUT}}\right)\left(\frac{A_{REF}}{y_{REF}}\right) \quad \text{Equation (1)}$$

Figure 11:
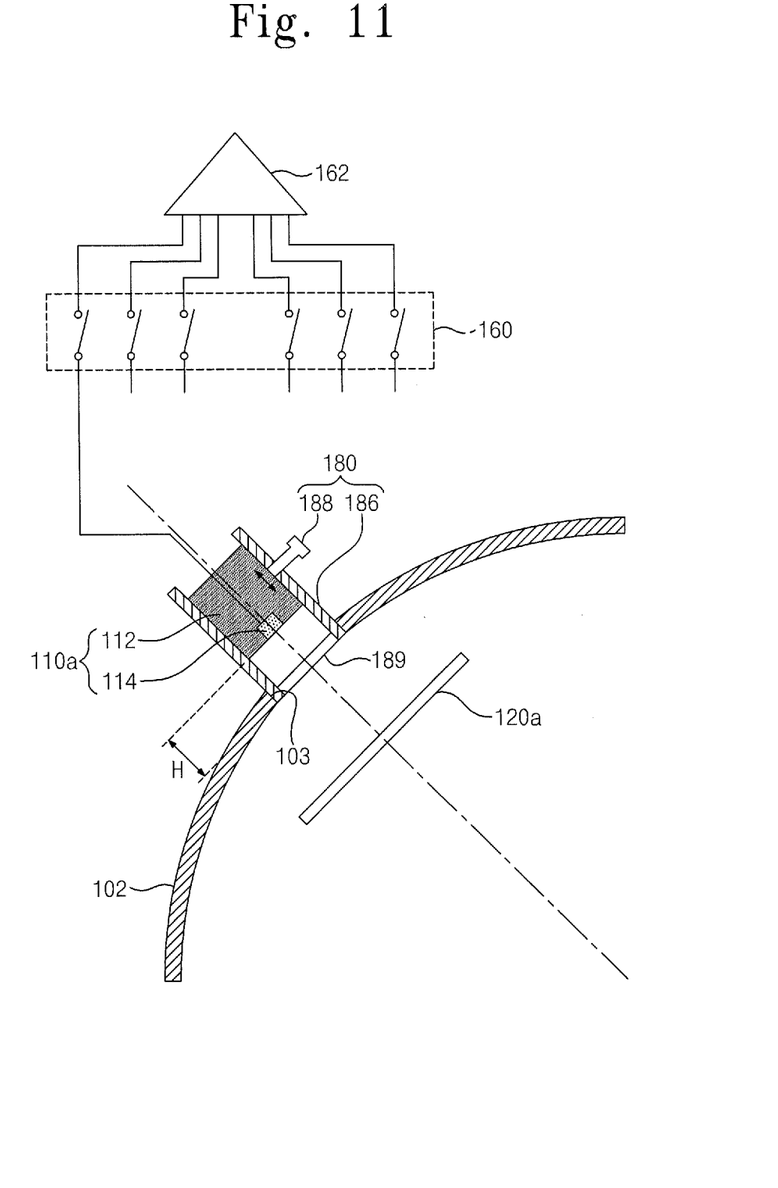
FIG. 11 is a sectional view of an integrating sphere photometer according to yet another embodiment of the present invention.

FIG. 11 is a partial sectional view of an integrating sphere photometer according to yet another embodiment of the present invention.

Referring to FIG. 11, the integrating sphere photometer may include an integrating sphere 102 having a plurality of through-holes, a plurality of photometers 110a disposed at the through-holes 103, baffles 120a disposed in front of the photometers 110a to be spaced apart therefrom, and a correction unit 180 correcting output signals of the photometers 110a to have the same response characteristics to light emitted from a standard light source disposed in the central area inside the integrating sphere 102. The correction unit 180 may include a diffusion plate 189 disposed between the photometer 110a and an entrance of the through-hole 103 and moving means 180 for adjusting positions of the photometers 110a.

The moving means 180 may include a cylindrical cylinder 186 and a clamp 188 which is capable of fixing the photometer 110a. The photometer 110a may include a photodetector 114 and an outer case 112 supporting the photodetector 114. The photometer 110a may adjust a distance between the photodetector 114 and the diffusion plate 189 inside the cylinder 186 to control sensitivity of the photometer 110a. Thus, the magnitude of an output signal of the photometer 110a may be adjusted without use of an electronic circuit.

As described so far, a plurality of photometers are disposed on a surface of an integrating sphere symmetrically or at regular distances from each other to make spatial response of the integrating sphere uniform. Thus, although a general standard light source of point light source type is used, a spatial mismatch error can be efficiently removed during measurement of a directional light source.

As described above, according to an embodiment of the present invention, a plurality of photometers are disposed on a surface of an integrating sphere symmetrically or at regular distances from each other to make spatial response of the integrating sphere uniform. Thus, although a general standard light source of point light source type is used, a spatial mismatch error can be efficiently removed during measurement of a directional light source.

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the present invention.

What is claimed is:

1. An integrating sphere photometer comprising:
   an integrating sphere having a plurality of through-holes;
   a plurality of photometers disposed at the through-holes;
   baffles disposed in front of the photometers to be spaced apart therefrom; and
   a correction unit correcting output signals of the photometers to have the same response characteristics to light emitted from a standard light source disposed in the central area inside the integrating sphere;

wherein the correction unit comprises:

a diffusion plate disposed between the photometer and an entrance of the through-hole; and moving means for adjusting positions of the photometers.

2. An integrating sphere photometer comprising:

an integrating sphere having a plurality of through-holes;

a plurality of photometers disposed at the through-holes;

baffles disposed in front of the photometers to be spaced apart therefrom;

an auxiliary light source disposed inside the integrating sphere;

an auxiliary baffle disposed in front of the auxiliary light source;

a summing unit summing output signals of the photometers to light emitted from a light source to be measured disposed in the central area inside the integrating sphere; and a correction unit correcting output signals of the photometers to have the same response characteristics to light emitted from a standard light source disposed in the central area inside the integrating sphere, wherein the correction unit comprises preamplifiers amplifying output signals of the photometers, and when the standard light source turns on, and the gain of the preamplifiers is adjusted to output the same signal intensity.

3. A measuring method of an integrating sphere photometer, comprising:

providing a plurality of photometers disposed at through-holes of an integrating sphere having the through-holes and baffles spaced apart from the photometers;

providing an auxiliary light source inside the integrating light source and an auxiliary baffle in front of the auxiliary light source;

correcting the photometers to have the same response characteristics to light emitted from a standard light source disposed in the central area inside the integrating sphere;

disposing the standard light source in a central area inside the integrating sphere and turning on the standard light source to measure currents of the photometers;

turning off the standard light source and turning on the auxiliary light source to measure currents of the photometers;

removing the standard light source, turning off the auxiliary light source, and turning on the light source to be measured to measure current of the photometers; and turning off the light source to measure and turning on the auxiliary light source to measure currents of the photometers.

4. A measuring method of an integrating sphere photometer, comprising:

providing a plurality of photometers inside an integrating sphere and baffles in front of the photometers;

providing an auxiliary light source inside the integrating sphere and an auxiliary baffle in front the auxiliary light source;

providing a light source to be measured or a standard light source in a central area inside the integrating sphere;

summing output signals of the photometers to light of the light source to be measured or the standard light source disposed in the central area inside the integrating sphere; and turning on the standard light source and adjusting the output signal of the photometers to the same level.

5. A measuring method of an integrating sphere photometer, comprising:

providing a plurality of photometers inside an integrating sphere and baffles in front of the photometers;

providing an auxiliary light source inside the integrating sphere and an auxiliary baffle in front the auxiliary light source;

providing a light source to be measured or a standard light source in a central area inside the integrating sphere; and summing output signals of the photometers to light of the light source to be measured or the standard light source disposed in the central area inside the integrating sphere, wherein the summing of the output signals of the photometers comprises:

disposing the standard light source in a central area inside the integrating sphere and turning on the standard light source to measure currents of the photometers;

turning off the standard light source and turning on the auxiliary light source to measure currents of the photometers;

removing the standard light source, turning off the auxiliary light source, and turning on the light source to be measured to measure current of the photometers; and turning off the light source to the measured and turning on the auxiliary light source to measure currents of the photometers.

* * * * *